United States Patent
Petkov

(10) Patent No.: US 10,341,025 B1
(45) Date of Patent: Jul. 2, 2019

(54) OPTICAL DATA SYSTEM FOR TORQUE SENSOR

(71) Applicant: FUTEK Advanced Sensor Technology, Irvine, CA (US)

(72) Inventor: Georgi Petrov Petkov, Aliso Viejo, CA (US)

(73) Assignee: FUTEK Advanced Sensor Technology, Irvine, CA (US)

( * ) Notice: Subject to any disclaimer, the term of this patent is extended or adjusted under 35 U.S.C. 154(b) by 0 days.

(21) Appl. No.: 15/968,328

(22) Filed: May 1, 2018

(51) Int. Cl.
*G01L 3/10* (2006.01)
*H04B 10/27* (2013.01)
*H04B 10/50* (2013.01)
*H04B 10/60* (2013.01)

(52) U.S. Cl.
CPC .............. *H04B 10/27* (2013.01); *G01L 3/108* (2013.01); *H04B 10/502* (2013.01); *H04B 10/60* (2013.01)

(58) Field of Classification Search
CPC .... H04B 10/27; H04B 10/275; H04B 10/502; H04B 10/60; G01L 3/108
USPC ...... 73/750, 800, 862.338, 862.324, 862.326
See application file for complete search history.

(56) References Cited

U.S. PATENT DOCUMENTS

| 5,253,531 | A   | 10/1993 | Walker et al. |
| 6,563,109 | B1* | 5/2003  | Kosters ............. G01L 3/12 250/231.15 |
| 7,355,165 | B2  | 4/2008  | Shaw et al. |
| 7,784,364 | B2  | 8/2010  | Matzoll et al. |
| 8,264,374 | B2  | 9/2012  | Obatake et al. |

* cited by examiner

*Primary Examiner* — Natalie Huls
*Assistant Examiner* — Suman K Nath
(74) *Attorney, Agent, or Firm* — Young Basile Hanlon & MacFarlane, P.C.

(57) ABSTRACT

An optical system for wireless data communication between the sensor electronics on a rotary shaft and the fixed data processor is disclosed. A first ring carrying IR LEDs is mounted to rotate with the shaft. A second ring carrying a photodetector is mounted adjacent to the first ring but does not rotate with the shaft. In the disclosed embodiment, both rings have LEDs and a photodetector so data and/or information can be transferred both to and from the shaft.

6 Claims, 4 Drawing Sheets

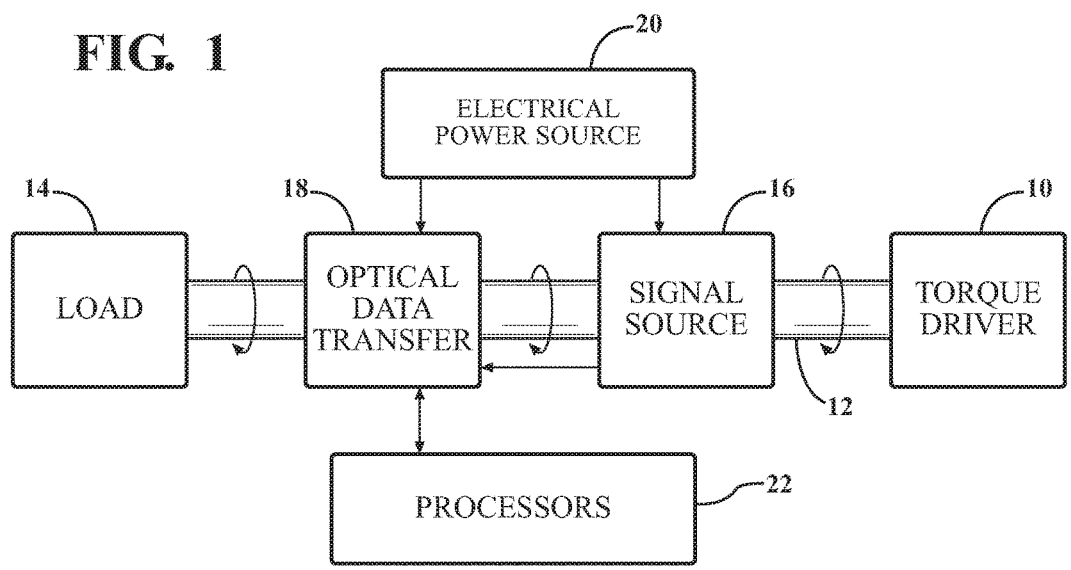
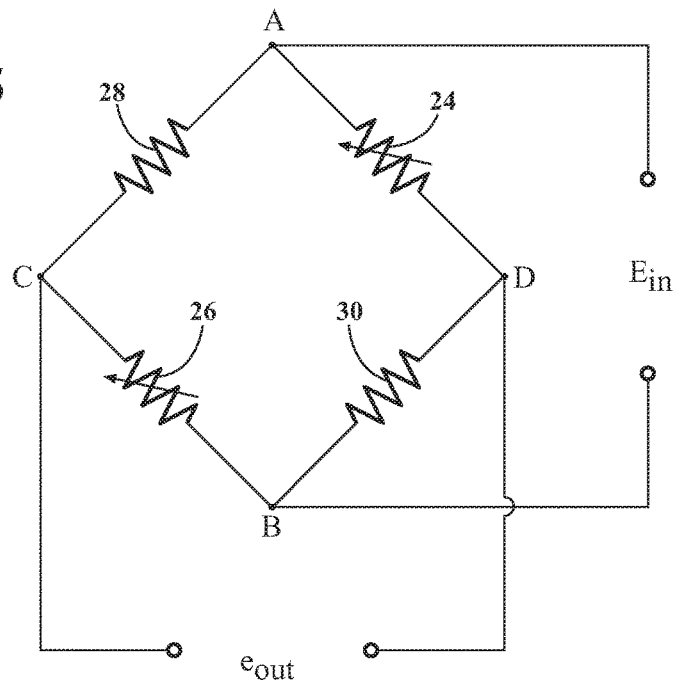

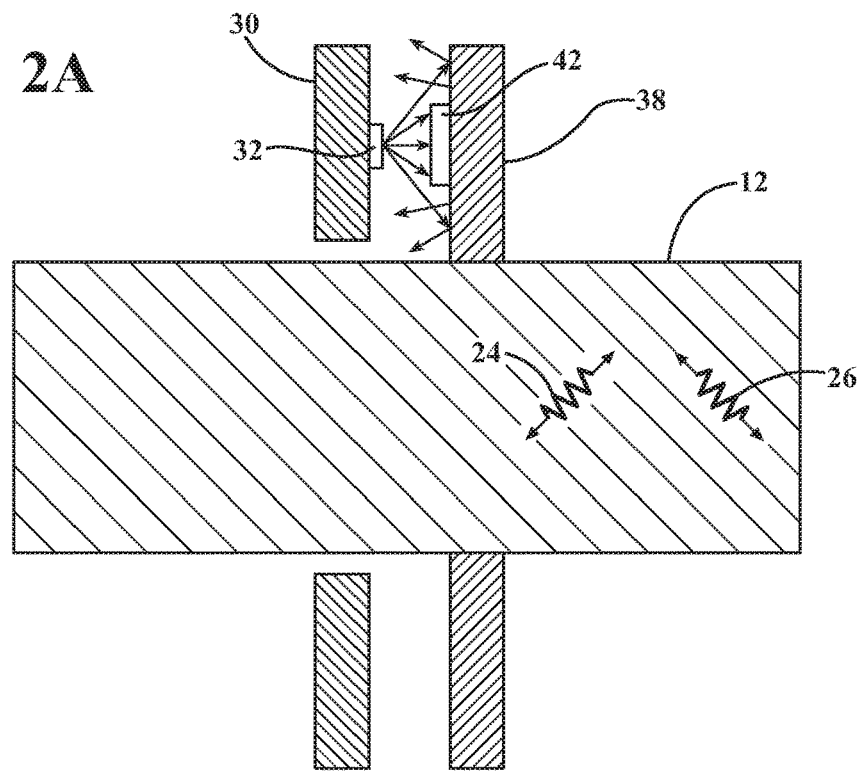
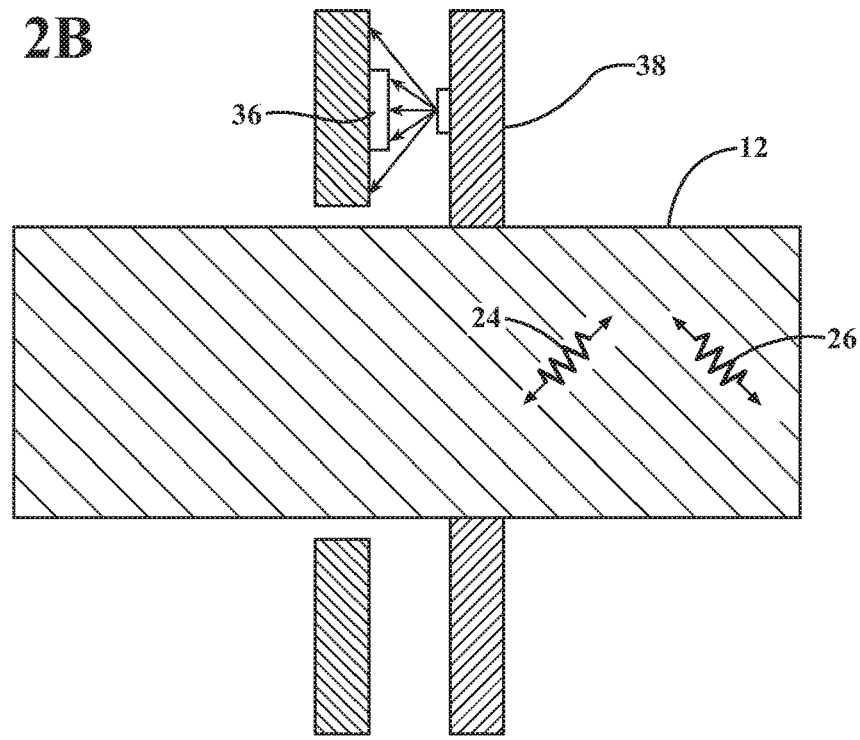

OPTICAL DATA SYSTEM FOR TORQUE SENSOR

FIELD OF THE INVENTION

This invention is in the field of torque measurement with particular emphasis on the manner in which data is wirelessly transferred from the sensors physically associated with a rotary structure to the stationary world of the measurement system.

BACKGROUND

It is well known that torque transmitted through, for example, a driven shaft can be measured using Hall effect devices or foil strain gages bonded to the shaft in strategic locations and acting as the variable resistors of a Wheatstone bridge. When, as shown in FIG. 5, terminals A and B of the bridge are excited by a voltage source, variations in the resistance of the stain gage resistors (shown with through arrows) result in a voltage at the output terminals C and D. When there is no flex in the shaft due to transmitted torque, the bridge is said to be "balanced" and there is no output voltage across the C and D terminals.

The question then arises: how does one transfer the data from a Wheatstone bridge and/or other sensors mounted on a rotatable shaft, and/or the signals derived therefrom, to a processor and/or display unit in the stationary electronics needed to condition, record, analyze and/or display the data?

The conventional wisdom is to use slip rings. More sophisticated solutions to this problem involve wireless transmission systems; see, for example, U.S. Pat. No. 8,264,374 to Obatake et al. issued Sep. 11, 2012 disclosing an RF digital data transmission system in a torque applying device using a rotary shaft. A disadvantage of RF systems is the possible need to comply with regulatory standard such as those coming from the Federal Communication Commission (FCC). Inductive systems are also known but they are less compatible with high rate digital signal transfer.

SUMMARY OF THE INVENTION

While the present invention may rely on conventional strain gage or Hall effect technology for initial torque signal generation, it utilizes an optical system for the transfer of signals and "data" to and from the shaft mounted electronics and the outside world, thus eliminating or minimizing the disadvantages associated with RF and inductive systems.

The embodiment herein describes includes two optically coupled members, hereinafter referred to as "rings," are used to transfer "data" from the shaft mounted electronics to the outside world. A shaft mounted ring is equipped with a circular arrangement of IR LEDs on a planar surface that is in close parallel proximity to the planar surface of an adjacent stationary ring. Both rings have their centers on the shaft axis. The stationary ring carries a photodetector capable of receiving light pulses from the LEDs on the rotary ring, and the data carried by those pulses, and producing digital signals that can be processed as needed. Those signals may contain a data stream originating from, for example, a strain gage bridge or any of several other shaft-mounted signal sources.

In the preferred embodiment hereinafter described in detail, both rings are substantially identically equipped with multiple IR LEDs and a single photodetector. These devices are associated with control systems that initiate an exchange whereby the stationary ring activates its LEDs to assume a "transmit" mode while the shaft ring activates its photodetector thereby to assume a "receive" mode. The signals from the stationary ring LEDs carry commands or requests telling the electronics on the shaft side what data it wishes to receive. The commands or requests are embedded in the LED light pulses and come from a TX buffer and an LED driver circuit as hereinafter described.

During this command or request transmission, the shaft mounted side is in a "receive" mode as stated above. However, once the TX buffer on the stationary side is emptied, the stationary ring switches to a "receive" mode, and the electronics on the rotary ring side switch to a "transmit" mode to transmit the requested data back to the photodetector on the stationary ring. A TX buffer on the shaft side loaded with data from, for example, the strain gage flexure section and the signal conditioning electronics, transmits the data in its TX buffer through the IR LEDs on the shaft ring. During this transmission, the illumination from these LEDs is incident upon the single photodetector on the stationary ring. The stationary ring LEDs are turned off.

The data to be transmitted from either side is sent simultaneously; i.e., in parallel, to all of the IR LEDs on the appropriate shaft ring. Moreover, the illumination pattern and spacing of the LEDs is such is to cause overlap in the light pulses incident on the receiving side photodetector. Therefore, the serial data string is transferred to the receiving side without interruption albeit the torque shaft may be rotating during the transmission. The angular spacing between LEDs as well the axial spacing between the parallel surfaces of the two facing rings is such to produce this desirable overlap and continuity in the data transfer.

In the most preferred embodiment, the confronting surfaces of the two rings are plated with a reflective metal such as gold to even out the illumination patterns.

The sequential, bi-directional exchange of data between the two rings is described herein as a "hand shake" relationship or methodology wherein one side asks the other side for data and the other side thereafter provides it, the two sides switching back and forth between transmit and receive modes as necessary to continue the exchange. This is also described as a "half-duplex" mode of operation.

The word "data" is used herein to describe the content of the modulated/encoded electrical and optical pulses from both sides notwithstanding the fact that signals coming from the stationary side typically carry a request or a command.

The term "ring" is used herein to describe the carriers for the LEDs and photodetectors but does not necessarily imply that the body must always be physically annular even though the arrangement of the LEDs is typically such that all of the LEDs lie at the same radial distance from the center of rotation of the torque shaft that passes coaxially through the rings.

BRIEF DESCRIPTION OF THE DRAWINGS

FIG. 1 is a block diagram of an overall system for carrying out the objectives of the present invention;

FIG. 2A is a schematic diagram of a torque shaft passing through the centers of two optical rings in one transmission condition; i.e., the condition in which the stationary ring LEDs are sending a request;

FIG. 2B is a schematic diagram of the torque shaft passing through the two optical rings in a second transmission condition; i.e., the condition in which data is being transmitted from the shaft mounted ring to the stationary ring;

FIG. 5 is a circuit diagram of a conventional Wheatstone bridge using two strain gages as variable resistors as explained above.

DETAILED DESCRIPTION OF THE ILLUSTRATIVE EMBODIMENT

Figure 3A:
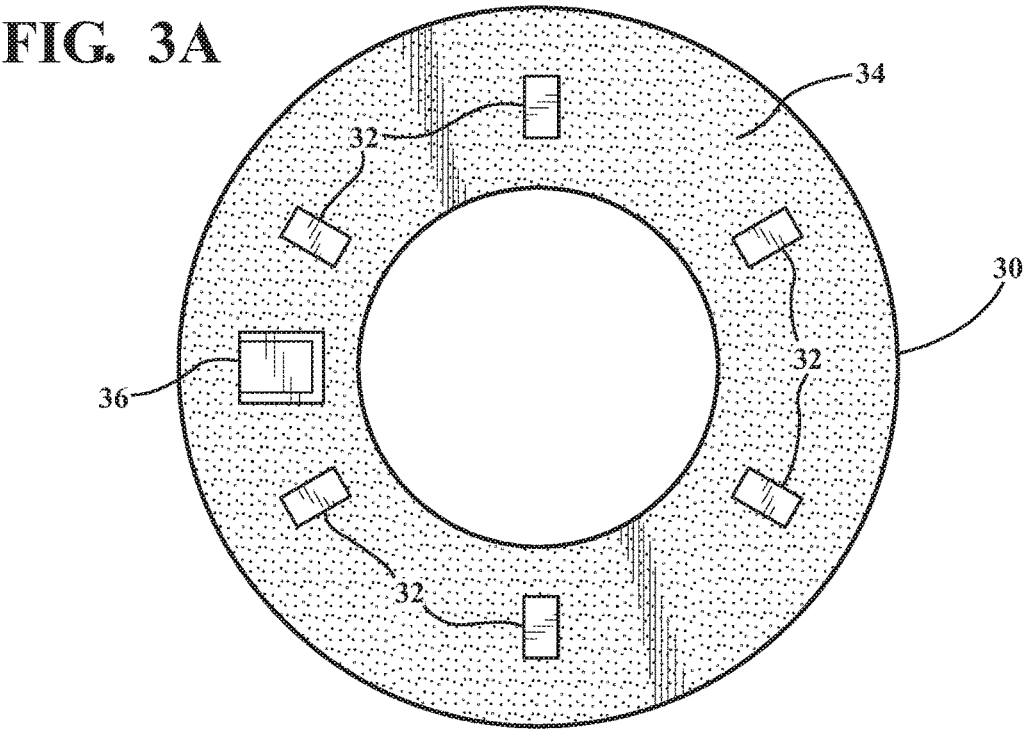
FIG. 3A is a plan view of the plated reflective surface of the stationary ring showing the arrangement of the IR LEDs and photodetector.

FIG. 1 shows in block diagram form a torque application including a torque driver 10 having a rotatable output shaft 12 through which torque can be transmitted to a load 14 such as a threaded fastener. This combination should be considered as generic to any of a wide variety of applications including, by way of example, a torque motor test stand, a power tool for a threaded fastener, a torque verification/calibration system, a nut runner with a torque measuring capability, a Stanford solar car dyno monitor, a valve torque tester and any of a variety of other industrial devices. The driver 10 is typically an electric motor but could also be simply the head of manual tool.

Mounted on the shaft is a strain gage section 16 consisting of foil type strain gages 24 and 26 connected into a Wheatstone bridge configuration as shown in FIG. 5 for the purpose of generating voltages representing torque transmitted from the driver 10 to the load 14 through the shaft 16 as function of strain or twist in the shaft. This technology is well known. Block 16 should also be taken as representative of other signal sources such as a shaft speed sensor, a temperature sensor and any of a variety of other signal sources associated with the rotating shaft, the magnitudes of which are to be processed, monitored or displayed for any of a variety of reasons.

The data from block 16 is transmitted as appropriate to the optical data transfer module 18 which will be described in greater detail hereinafter. Module 18 is capable of taking for example, the strain gage torque signals from the shaft 12 and delivering them to the processor module 22 which may include a display. Electrical power is provided to the units 16 and 18 by means of a power source 20 such as a battery pack, generator or AC line.

Referring to FIG. 5, a conventional Wheatstone bridge arrangement, well known in the art, is shown. The variable resistor strain gages 24 and 26 are foil strain gages mounted on a flexure portion of a shaft and are connected into a bridge circuit along with fixed resistors 28 and 30. Power for the bridge is supplied by a conventional source across terminals A and B. The output signal e out appears across terminals C and D. If the resistors 24 and 28 are equal in value and the resistors 26 and 30 are equal in resistive value, the voltage difference between terminal C and D is zero and the output e out is zero. However, if strain gage resistor 24 increases in value and strain gage resistor 26 decreases in value as a result of flexing in the shaft 12, then the voltage drops across the left and right legs are different at the center terminals C and D and a voltage will appear across terminals C and D in proportion to the torque being transmitted through the shaft 12.

Referring now to FIGS. 2A, 2B, 3A, 3B, 4A and 4B, the make-up of the optical system for performing the data transfer function of module 18 will be described in detail.

FIGS. 2A and 2B represent a portion of the torque transmission shaft 26 with foil type strain gage resistors 24 and 26 bonded to the shaft to measure strain in the shaft resulting from the transmission of torque through the shaft that causes flexing or twisting in the shaft. A flexure section may be engineered to amplify twist in the shaft due to torque. The location of the strain gage resistors 24 and 26 is merely schematic and is not intended to suggest that they are in any particular physical or locational relationship relative to the other elements carried by the shaft 12.

Figure 3B:
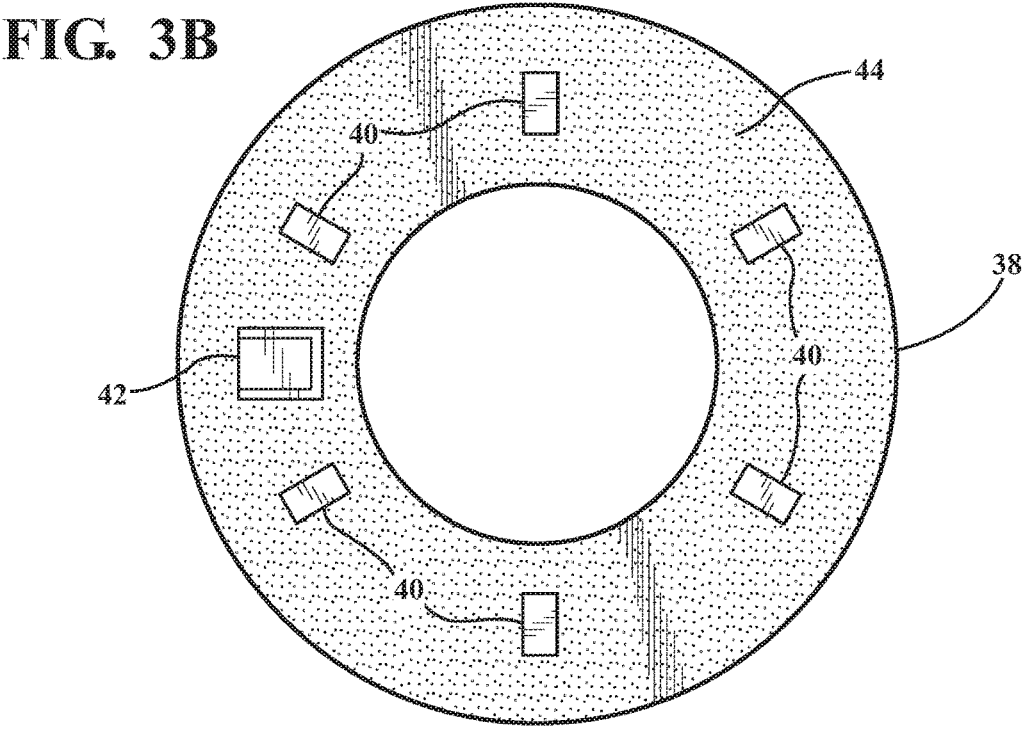
FIG. 3B is a plan view of the plated reflective surface of the shaft mounted ring.

A first annular printed circuit board member in the form of a ring 30 is shown coaxially mounted around but not in contact with the shaft 12. It is mounted to a housing (not shown) so as to be "stationary" relative to the shaft 12. Spaced to the right of the ring 30 is a second substantially identical printed circuit board ring 38 which is coaxial with the ring 30 as well as the shaft 12 and is mounted to the shaft for rotation therewith. The confronting annular surfaces of the two rings are shown in FIGS. 3A and 3B as surfaces 34 and 44 both of which are gold plated for reasons to be discussed. The surfaces 34 and 44 are parallel and approximately 6 mm apart.

Mounted on the surface 34 of ring 30 is a set of IR LEDs 32 all at the same radial distance from the center of the ring and shaft and uniformly spaced in 60° intervals. The IR LEDs are capable of being turned on and off in pulsed fashion at a very high rate as hereinafter described in greater detail.

Between two of the IR LEDs and at the same radial distance from the center of the ring 30 is a photodetector 36 which is capable of producing a current signal when light from an IR LED; i.e., light in the infrared portion of the wavelength spectrum, is incident thereon.

Ring 38 which is fixed to the shaft 12 for rotation therewith has an arrangement of LEDs 40 and a photodetector 42 in exactly the same spatial arrangement as the IR LEDs and photodetector found on the ring 30. Accordingly, because the two rings face each other as shown in FIGS. 2A and 2B, the IR LEDs on each ring are capable of continuously illuminating the photodetector on the opposite ring as the two rings rotate relative to one another in service.

Figure 4A:
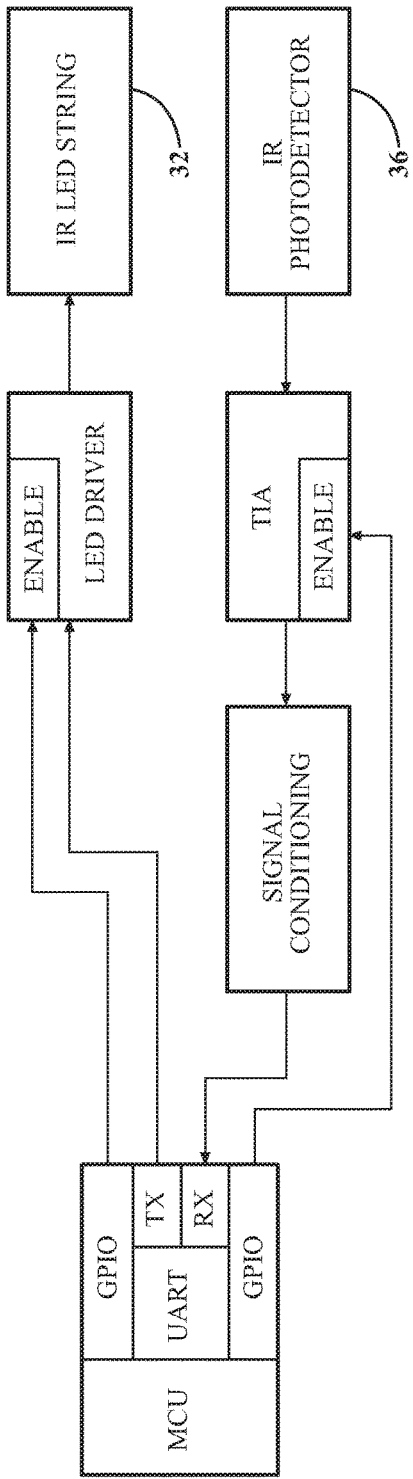
FIG. 4A is a block diagram of the processing system associated with the LEDs and photodetector on the stationary ring.
Figure 4B:
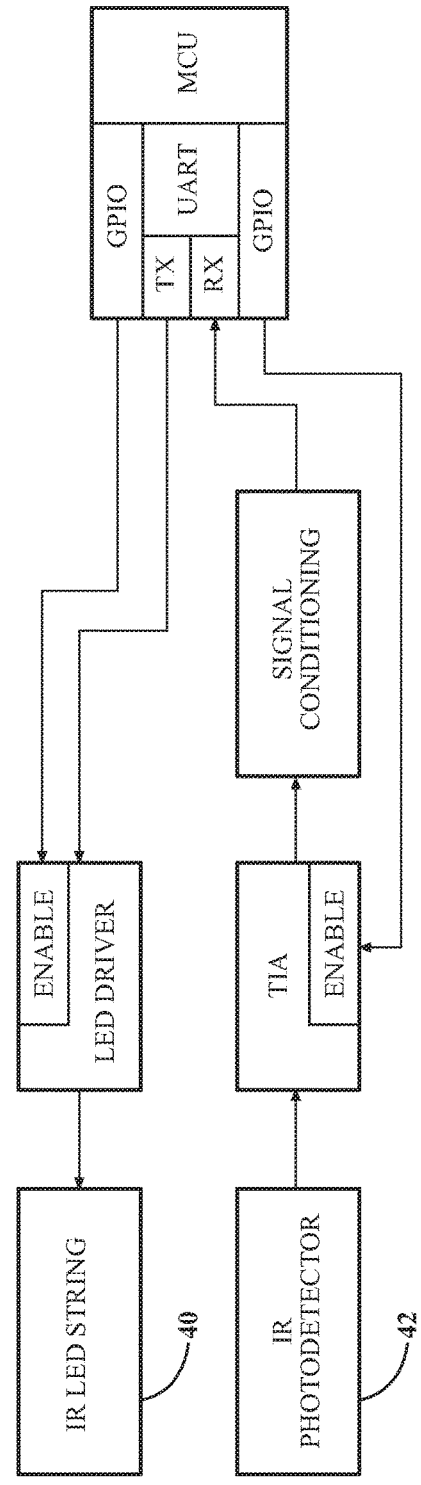
FIG. 4B is a block diagram of the processing system associated with the LEDs and photodetector on the shaft mounted ring.

FIG. 4A illustrates in block diagram the control system for placing the photo electric elements 32, 36 on the ring 30 in condition to begin a data transfer process. In broad terms the system of FIG. 4A begins a data transfer by applying an output from a TX buffer to an LED driver along with an enable signal from the GPIO to illuminate the IR LEDs 32 on the ring 30 to begin the transmission of an initiation command. The data or information for the command comes from the TX buffer in FIG. 4A to the LED driver and modulates the light output of the all six of the LEDs 32 simultaneously to convey the command or request information to the photodetector 42 on the shaft mounted ring 38. In short, the LEDs on the stationary ring 30 are in a "transmit mode" while the photodetector 42 on the rotatable ring 38 is in a "receive mode."

At the same time and in this same mode the photodetector 32 on the stationary ring is disabled; i.e., unreceptive to light pulses, and the LEDs 40 on the shaft ring 38 are similarly disabled; i.e., turned off.

After the TX buffer in FIG. 4A has been emptied, the roles of the photoelectric elements on the two rings 30 and 38 are reversed; i.e., the IR LEDs 32 on the stationary ring 30 are disabled and the photodetector 36 is enabled along with the TIA and signal conditioning circuity of FIG. 4A so that data transmitted from the rotating ring 38 by modulation of the light output of the IR LEDs 40 incident upon the stationary ring photodetector 36 causes data to flow in serial form into the RX buffer in FIG. 4A. This "handshake" relationship or sequence continues; i.e., after the TX buffer of the rotating ring has emptied, the control system turns the IR LEDs 40 off and reenables the photodetector 42 to receive another command/request from the LEDs 32 on the stationary ring. The stationary ring returns to "transmit" mode. This request/respond handshake relationship continues throughout the torque monitoring activity. The information conveyed can include not only torque, but other quantities and conditions as explained above.

Discussing the matter in greater detail, one should start with the principle that the LEDs 40 on the shaft mounted ring 38 will not provide data until they are first addressed by the signals from stationary ring.

At start-up both the stationary and shaft mounted rotatry rings have their TIAs enabled by setting the TIA enable line high. This puts both rings in the "receive" mode. Both rings have their LED drivers disable by clearing the LED driver enable lines; i.e., in this case "clearing" means setting the control signal low.

To begin the first transmission the TIA enable line is set low which shuts off the TIA on the stationary ring side shown in FIG. 4A. The MCU enables the LED driver and loads data into the UART TX buffer. The UART sends the TX buffer data over the TX signal line to the LED driver. The LED driver pulses the entire IR LED string on the stationary ring with the same information at the same time. After the TX buffer is emptied the LED pulsing terminates and the LED driver is disabled. The TIA is then enabled to place the photodetector 36 on the stationary ring in the receive mode. Following transmit/receive exchanges or "handshakes" are handled in the same way.

The photodetector 42 on the shaft ring in this first exchange captures the LED light pulses from the stationary ring and converts them into photo current pulses. The photo current pulses are then converted by the TIA on the rotary ring side into voltage pulses. These voltage pulses are passed through the signal conditioning device which operates as a comparator to remove noise and scale the voltage pulses to standard digital levels which in this case is 3.3 v since the MCU is powered at this voltage level.

The signal conditioning output goes into the MCU UART RX line where the data is stored into the UART RX buffer. The MCU periodically checks the UART RX buffer for the presence of data. When there is data present in the RX buffer, the MCU disables the TIA and turns on the LED driver to place the unit in the transmit mode. The photo electric components on the stationary ring are ready for this as explained above.

The MCU collects the data from the RX buffer and interprets the data and loads a response to the RX data; usually a command.

It can be seen that from this detailed explanation that this is a handshake relationship between the two rings and it will continue until all desired data exchanges have been made.

For purposes of the above explanation, the abbreviations GPIO stands for General Purpose Input Output; the abbreviation TX stands for the Transmit Data Buffer whereas the abbreviation RX stands for the Data Receive Buffer. The abbreviation UART stands for Universal Asynchronous Receiver/Transmitter; the abbreviation MCU stands for Micro Controller Unit and the abbreviation TIA stands for Trans Impedance Amplifier, the device that converts current signal into voltage signals.

In the illustrated system, the LEDs are turned on and off at a 4 MHz rate. This means that the data is being transferred at 4 megabaud per second. This rate can be higher or lower but in the present embodiment is the upper speed limit of the on-board electronics.

The light coming from the LEDs is not a point, but, rather, is a light spot with maximum intensity along the LED center axis. With the proper spacing the LED illumination spots overlap adjacent LEDs. This results in a circular illumination pattern projected onto the adjacent ring. That pattern will have maximums and minimums which are treated by the interpretation components as noise. The gold plating is highly reflective on both rings and increases the strength of the optical coupling and evens out the illumination thereby minimizing the aforementioned maximum and minimum light intensity pattern.

Received light pulses are converted into photo current pulses by the photo diode and amplified by the TIA. Any left-over noise is removed by a Schmitt trigger comparator which sets a minimum level the signal must exceed in order to result in the creation of a data pulse. The output of the LED ring is, therefore, a digital data stream sent by the LEDs on the other ring when operating in the pulsed mode.

The system may be described as operating as in a half-duplex mode; i.e., when the rotating rings LEDs are pulsing the photodetector on that ring is turned off and the photo-detector on the opposite or receiving ring is turned on while the LEDs on that ring are turned off. When the handshake exchange is over the opposite condition obtains.

As far as providing power to the electronics on the rotating ring is concerned, that may be achieved either with slip rings or, preferably, by inductive coupling wherein primary and secondary coils are stationary and rotary respectively. The transfer of power to the stationary ring is straight forward.

While the invention has been described with respect to a specific and illustrative embodiment thereof, it is to be understood that various modifications and additions to the structures and electronics described can be made without departing from the spirit and scope of the invention as well as the basic operation thereof.

What is claimed is:

1. A system for transferring data from a rotatable member to a stationary receiver comprising:
   a first carrier ring mounted to rotate with the rotatable member, the first carrier ring carrying a plurality of angularly spaced IR LEDs capable of operating in a pulsed mode;
   a source of data signals including a plurality of strain gages carried by said member and connected to activate the LEDs in a pulse mode so as to transmit data in the form of IR light pulses;
   a second carrier ring fixedly mounted in spaced, coaxially and parallel relationship to the first carrier ring; and
   a first photo detector mounted on the second carrier ring in a location to receive IR pulses from the IR LEDs on the first carrier ring and produce a data stream corresponding to the data carried by said IR pulses from the IR LEDs on the first carrier ring;
   wherein the first carrier ring also carries, in addition to the IR LEDs, a second photo detector for producing electronic signals in response to IR incident light pulses, the second carrier ring also has mounted thereon in optical communication with the first photo detector on the first carrier ring, wherein the second carrier ring comprises a plurality of angularly spaced IR LEDs capable of being operated in a pulsed mode to transmit commands to the second photo detector on the first ring;

whereby the first and second carrier rings can operate in a repeating handshake mode wherein the second ring transmits a command for data to the photo detector on the first ring and the first ring responds by transmitting data back to the photo detector on the second ring.

2. The system as defined in claim 1 wherein the IR LEDs on the second ring transmit commands to the second ring to the tell the signal processing electronics associated with the first ring the type of data that the second ring wants to receive.

3. The system as defined in claim 2 wherein the first and second rings have generally planar mounting surfaces for the IR LEDs and photodetectors, which surfaces face one another and are plated with a reflective metal.

4. The system as defined in claim 3 wherein the metal is gold.

5. The system as defined in claim 1 wherein the rotatable member is a driven shaft configured to transmit torque.

6. The system as defined in claim 5 wherein the plurality of strain gages are mounted on the shaft to produce signals representing flex in the shaft caused by transmitted torque.

* * * * *